(No Model.) 2 Sheets—Sheet 1.
C. DE QUILLFELDT.
TOOL FOR FORMING THREADS, &c., UPON BOTTLES, &c.
No. 333,733. Patented Jan. 5, 1886.
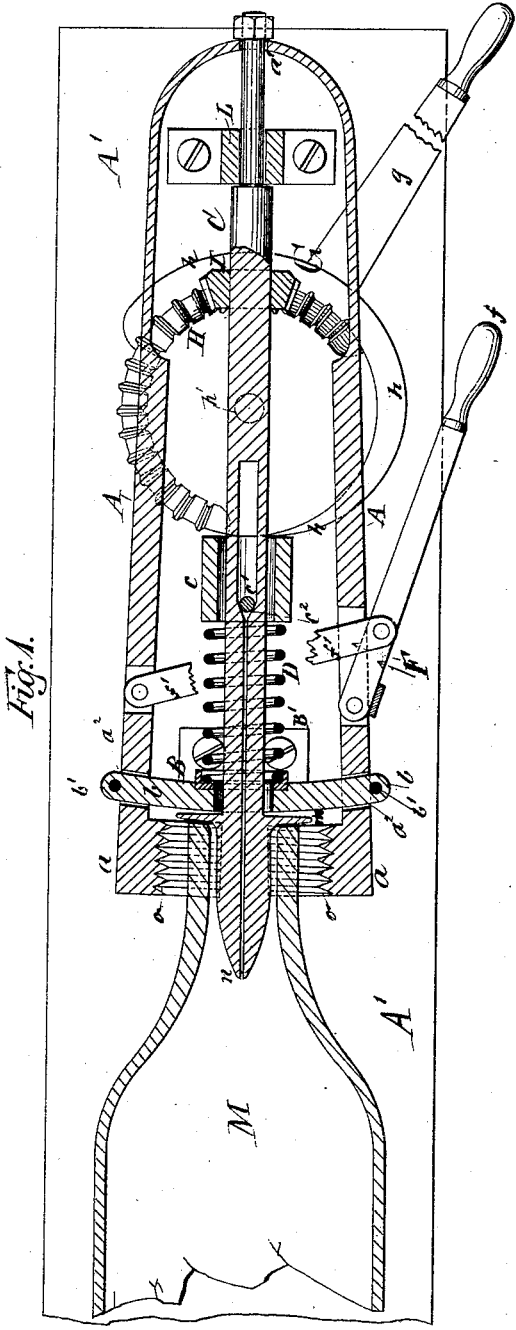
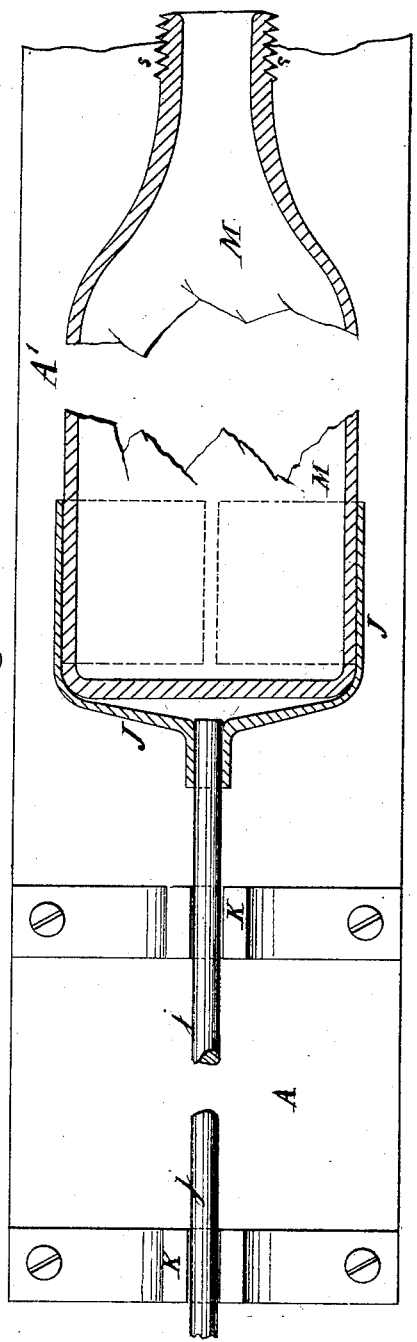
Witnesses:
H. Wahlberg
F. Johnson
Inventor:
Charles de Quillfeldt
By A. W. Almqvist
Attorney.

(No Model.) 2 Sheets—Sheet 2.
C. DE QUILLFELDT.
TOOL FOR FORMING THREADS, &c., UPON BOTTLES, &c.
No. 333,733. Patented Jan. 5, 1886.
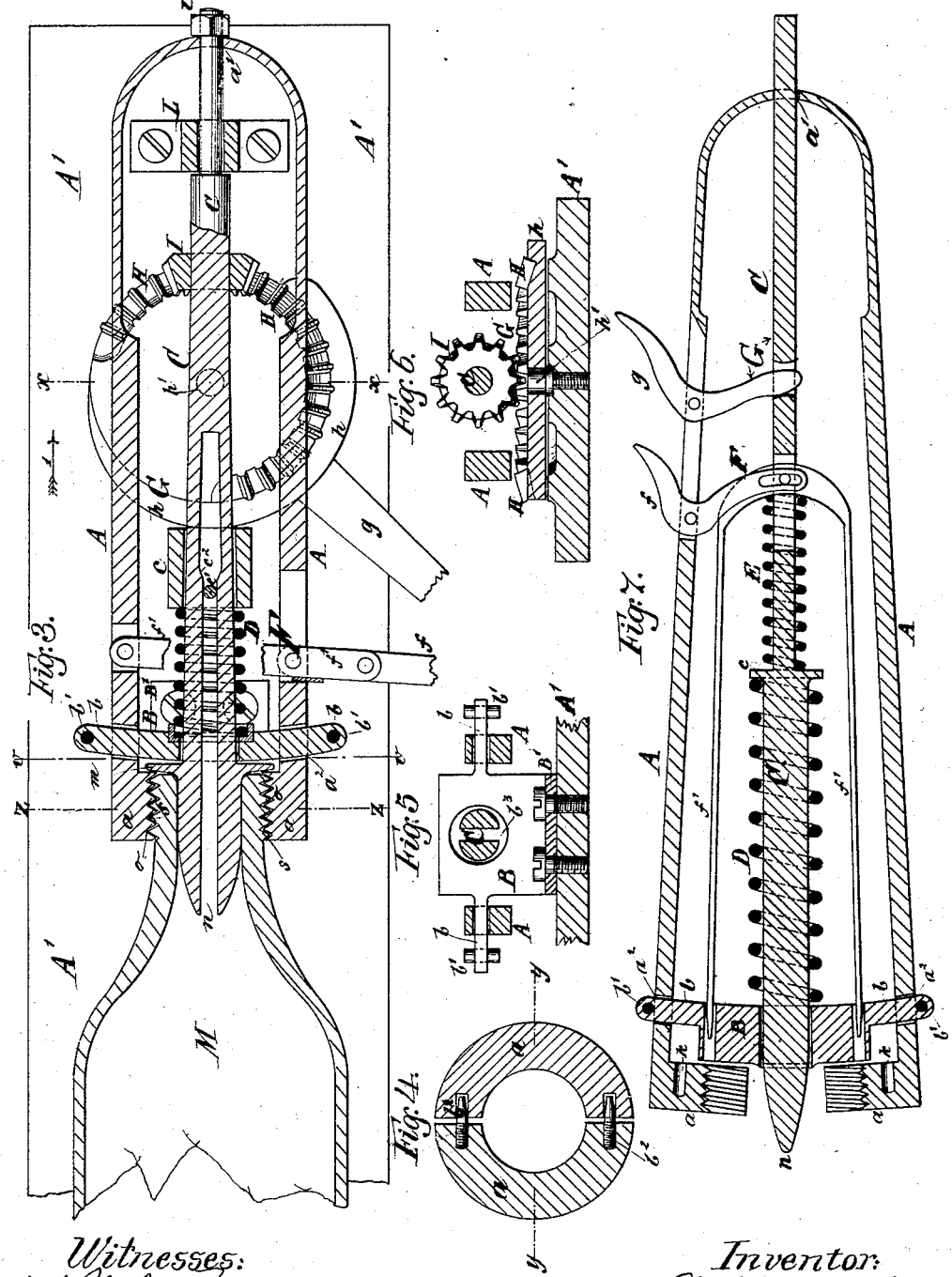
Witnesses:
H. Wahlberg
F. Johnson
Inventor:
Charles de Quillfeldt
By A. W. Almqvist
Attorney.

UNITED STATES PATENT OFFICE.

CHARLES DE QUILLFELDT, OF NEW YORK, N. Y.

TOOL FOR FORMING THREADS, &c., UPON BOTTLES, &c.

SPECIFICATION forming part of Letters Patent No. 333,733, dated January 5, 1886.

Application filed April 25, 1885. Serial No. 163,419. (No model.)

*To all whom it may concern:*

Be it known that I, CHARLES DE QUILLFELDT, a citizen of the United States, and a resident of New York, in the county and State of New York, have invented certain new and useful Improvements in Tools for Forming Outside Threads, &c., Upon Bottles, &c., of which the following is a specification.

The object of my invention is to provide a simple and efficient tool for forming full and sharp threads upon the outside of the necks of bottles and jars, &c., such as made of glass or other material which may be operated upon when in a plastic state, but more especially bottles or jars of glass.

Heretofore threads have been made upon bottle-necks by being blown in a mold; and it is a well-known fact that such threads never become sharp, but are always very imperfect. The end of the bottle-neck is afterward ground, thereby losing the roundness of the inner upper edge.

My present invention is designed to round off the inner edge of the bottle-neck, make smooth and even its outer surface, and form sharp threads upon the outer circumference, all simultaneously and by a special hand-tool, entirely dispensing with blowing.

The invention will be hereinafter fully described as specifically pointed out in the claims, reference being had to the accompanying two sheets of drawings, in which Sheet 1, Figs. 1 and 2, represents in horizontal section a tool constructed according to my present invention, Fig. 2 being really a continuation of the left portion of Fig. 1, but for want of space placed beneath it upon the drawings.

In Fig. 1 the jaws of the tool are shown as open and the neck of the bottle inserted in them ready to be operated upon, and the tool is stationary or permanently attached to a table or bed-plate. Fig. 3 is a horizontal section of the same tool as shown in Fig. 1, but with the jaws closed and the threads formed upon the bottle, the jaws being sectioned as on the line Y Y of Fig. 4. Fig. 4 is a detail cross-section of the jaws, taken on the lines Z Z of Fig. 3. Figs. 5 and 6 are detailed cross-sections taken on the line X X and V V, respectively, of Fig. 3, all of the Figs. 4, 5, and 6 being drawn, as seen, in the direction of arrow 1. Fig. 7 is a horizontal section of a modified form of the tool, not attached to a bed-plate, but intended to be manipulated entirely by holding it in one hand only.

Like letters of reference indicate like or equivalent parts in the several figures.

In common with the ordinary tool by which the head or ring around the neck of the bottle is formed, this has a core or spindle to enter the neck of the bottle and a pair of spring-jaws normally open, which, when the core is inserted, are closed upon the outside. In the ordinary tool, unlike this present, the bottle is revolved while the jaws are thus closed, so as to cause the plastic glass to conform to the shape of the jaws while becoming circular in cross-section.

The following are the generic and indispensable elements of the invention, whether the tool is mounted upon a bed-plate, as in Figs. 1 and 3, or adapted to be held in the hand only, as that shown in Fig. 7: A pair of jaws, A *a*, and a device, F, for closing and locking the said jaws, a core or spindle, C, arranged centrally between the said jaws, and a device, G, for expanding or advancing the said core laterally or longitudinally to widen within a certain limit the opening in the bottle-neck, thereby forcing the plastic glass outward, and thus causing the outer surface to conform to the shape of the jaws.

Referring to Figs. 1 to 6, inclusive, the tool is fixed upon the bed-plate A', and in axial line with the spindle or core C, is held, by the ordinary snap, J, the bottle M, the handle or rod *j* of the snap being rested in U-shaped bearings K upon the bed-plate A'. The bottle, as it is just blown and held by the snap, is introduced between the jaws and upon the end of the spindle C, in the position shown in Fig. 1. The jaws, threaded on the inside, are then closed and locked. The core is then operated to force the plastic glass outward to fill and conform it to the exact shape of the threads *o*, and at the same time make the opening in the bottle of the proper size.

A are the spring-shanks, united and centrally perforated at *a'*, and having at their outer ends the aforesaid jaws *a*, each forming a semicircle in cross-section, and both together, when closed, forming a nut of a continuous thread, *o*, inside.

B is what I term a "yoke," having lateral arms $b$, going through holes $a^2$ in the shanks A, to guide the proper closing of the jaws, the said yoke being curved, as shown in the drawings, to conform to the circular movement of the shanks in opening or closing. Through the ends of the arms $b$ are pins $b'$, which serve as stops against the outer surface of the shanks A to limit the outward movement.

In order to be sure that the jaws in closing fit exactly together, so as to make the thread inside continuous and perfect, one of the said jaws is provided with pins $b^2$, tapered upon their outer ends, as shown in Fig. 4, and which, as the jaws close, enter into corresponding sockets in the other jaw.

The yoke B is provided centrally with a hole, $b^3$, through which the forward portion of the spindle C is centered, the rear end of the spindle being fitted in the aforesaid hole $a'$ at the union of the two shanks A. When the tool is intended to be stationary, the rear end of the spindle is also held in a bracket or bearing, L, secured to the bed-plate A', and the yoke B has a flange, B', by which it also is bolted or screwed onto the bed-plate, as shown in Fig. 5.

To close and lock the jaws, a handle, $f$, or lever is pivoted to one of the shanks A, and a link, $f'$, pivoted with one end to the opposite jaw, has its other end pivoted to the lever $f$ at a suitable distance from the end pivot, both of the latter parts $f f'$ forming a toggle-joint, which, when moved from the position shown in Fig. 1 to that shown in Fig. 3, (so that the three pivotal points have moved into line or slightly beyond line with each other,) firmly locks the jaws together.

In the hand-tool, Fig. 7, the inner end of the lever $f$ is connected by a slot or pin to a yoke or fork which slides in a central slot in the spindle C, and the prongs $f'$ (the equivalent of the link $f'$ in Fig. 3) of the fork slide in holes through the yoke B and enter into sockets $k$ in the jaws $a$ when the latter are closed and the lever $f$ is pressed upon by the finger. On withdrawal of the pressure the locking device F is returned into its normal position by the action of a spiral spring, E, around the spindle.

When inserting the bottle into the jaws, the end of its neck may be shaped as desired and rounded on its inner edge by contact with a surface of corresponding shape, which surface in Fig. 7 is formed upon the yoke B and in Figs. 1 and 3 upon a flange, $m$, integral with the spindle.

The size of the opening and the radial outward pressure required to force the glass out in the female threads $o$ in the jaws in order to form the male threads $s$ on the bottle may be obtained by moving the core or spindle longitudinally or by expanding it laterally, only the former is suitable for the hand-tool, but the latter is preferable for the stationary tool.

Referring to Figs. 1 to 6, inclusive, the spindle C is slit longitudinally in the center line, and at the end of the slit the contiguous surfaces are gradually widening by inclines $c^2$ into a slot, in which a pin, $c'$, secured to a collar, $c$, is free to move without expanding the spindle while in the said slot. The said collar $c$ surrounds the spindle, as shown in the drawings, and is normally tending to withdraw from the slit by the action of a spiral spring, D, which surrounds the spindle, and is interposed between the said collar and the yoke B.

In order to move the collar $c$ outward or against the pressure of the spring D, I arrange upon the circumference of a cog-segment, H, pivoted at $h'$ to the bed-plate A', a cam, $h$, the curvature of which has a gradually-increasing radius for about a quarter of a turn, by a handle, $g$, rigid with the cam and segment. A pinion, I, secured upon the spindle C, meshes with the teeth of the segment H, and thus when the segment is turned by the handle $g$ the spindle C will revolve in its bearings L and in the bottle-neck at the same time as the collar $c$ is moved outward against the action of the spring D.

To form the thread, (the bottle, in a soft or plastic state, being inserted as in Fig. 1, and the jaws being locked as before stated,) $g$ is turned toward the left into a position as in Fig. 3. The gradually-rising cam $h$ forces the sliding collar $c$ outward, thus causing the pin $c'$ to wedge in between the inclines $c^2$ and into the slit of the spindle, thus expanding the two halves of the spindle head or point laterally with a pressure much stronger than ever could be applied by blowing, and compelling the plastic mass to fill the threads $o$, and thus form the threads $s$. During the gradual expansion of the spindle the latter is revolving, as aforesaid, by the segment H acting on the pinion I, thereby insuring perfect roundness of the opening in the bottle-neck and preventing the glass from entering the then open slit in the spindle. The rise of the cam $h'$ ceases o increase—that is, the curvature becomes concentric with the pivot $h'$—when the spindle has been expanded to give proper size to the opening, but yet before the segment H has been turned to its limit toward the left, thus allowing the spindle to be revolved a little as well toward the end of the left movement of the handle $g$ as on the beginning of the return movement toward the right to finish the surface in the bottle-opening, without change in diameter or lateral pressure. The threads being formed, the handle $g$ is turned toward the right, thus withdrawing the outward pressure on the collar $c$, and allowing the spring D to move it inward with the pin $c'$ away from the slit and into the wider slot, thereby contracting the spindle to its normal size, as in Fig. 1. The lock-lever $f$ being turned toward the right, as in Fig. 1, the bottle completed, with the threads upon its end, as in Figs. 2 and 3, is removed from the tool.

I do not limit myself in this invention to the mere production of threads upon the outside of a bottle, because any other fastening device or design may be cut or formed in the jaws a, and be reproduced in the glass, whether the configurations run longitudinally or transversely, continuously or intermittently, for it should be observed that in the operation of the device the bottle is not revolved in the jaws a.

In the hand-tool, Fig. 7, the size of the bottle-opening is formed by the gradually-increasing diameter of the tapering end of the spindle, the lateral pressure thus being formed by the longitudinal advance of the spindle into the bottle-neck. The spindle therefore not being slit, the collar c may be fast upon the spindle, the spring D withdrawing the the spindle from the bottle-neck when the outward pressure is removed. In that case the handle or lever g is pivoted to one of the shanks A, and its inner end works in a slot in the spindle. The spindle slides, but does not revolve, there being no slit in it to make the rotary movement necessary.

To operate with the hand-tool, the bottle is inserted with its neck upon the end of the spindle as before, the jaws are closed, the lever f depressed by the second finger to lock the jaws in the closed position by means of the prongs f' and sockets k, and while the lever f is kept depressed the lever g is depressed by the first finger to slide the spindle C into the bottle-neck and thereby expand the opening into the latter and force the glass into the mold of the jaws.

To remove the completed bottle, it is only necessary to remove the pressure-levers g f and shanks A, when the springs D and E will withdraw the spindle C from the bottle and the prongs f' from the sockets k, and allow spring-jaws to open.

Although the opening of the jaws makes the insertion and removal of the bottle most convenient, yet, inasmuch as the jaws are closed and entirely encircling the neck of the bottle when the threads are being formed, and the latter are formed by radial pressure outward only, it is evident that the jaws may be formed in one piece or permanently secured together closed, in which case the tool could be still more simplified by removing the entire locking device F. In that case, however, the removing of the bottle must of course be done by unscrewing it from the mold a a, by simply revolving the snap-handle j in its bearings k.

Having thus described my invention, I claim as new in a tool for molding exteriorly upon bottles or like articles when in a plastic state—

1. The combination of expanding molding-jaws $a\ a$, firmly closable to encircle exteriorly the tubular plastic article to be operated upon, and means, as F, for locking the said jaws, with a core, C, encircled by and movable within the tubular opening in the said article, and means, as G, for expanding the said opening by radial outward pressure of the said core.

2. The combination of the expanding jaws $a\ a$, firmly closable to encircle exteriorly the tubular or plastic article to be operated upon, and provided with guide-pins $b^2$ and corresponding sockets to insure perfect register of the mold when the jaws are closed, the yoke B, having lateral arms $b$ for guiding the movement of the said jaws, and suitable stops, $b'$, to limit the said movement, and means, as F, for locking the said jaws, with the core C, encircled by and movable within the tubular opening in the said article, and means, as G, for expanding the said opening by radial outward pressure of said core.

3. The combination of the expanding jaws $a\ a$, firmly closable to encircle exteriorly the tubular plastic article to be operated upon, the handle-lever $f$, pivoted to one of the jaw-shanks, and a link, $f'$, pivoted with one end to the said lever $f$, and with the other end to the other jaw-shank for locking the said jaws, the core C, and means, as G, for expanding the opening in the said tubular article by radial pressure of the said core.

4. In combination with the firmly-closable jaws $a\ a$, and means, as F, for locking the same, substantially as described, the spindle or core C, divided at its forward end by a central slit uniting by inclines $c^2$ with a central slot, the spring-pressed collar $c$, surrounding the spindle C and provided with the pin $c'$ going through the said slot and normally tending to withdraw from the said slit, the pinion I, secured upon the said spindle, and the pivoted cog-segment H, gearing with the said pinion and provided circumferentially with the cam $h$, acting upon the sliding collar $c$, all substantially as and for the purposes hereinbefore set forth.

In testimony that I claim the foregoing as my invention I have signed my name, in presence of two witnesses, this 18th day of April, 1885.

CHAS. DE QUILLFELDT.

Witnesses:
A. W. ALMQVIST,
BENJAMIN PSLOMQVIST.